March 29, 1949.
L. B. LINDEMUTH
2,465,463
REMELTING FURNACE AND METHOD FOR REMELTING SCRAP
Filed May 29, 1943
2 Sheets-Sheet 1
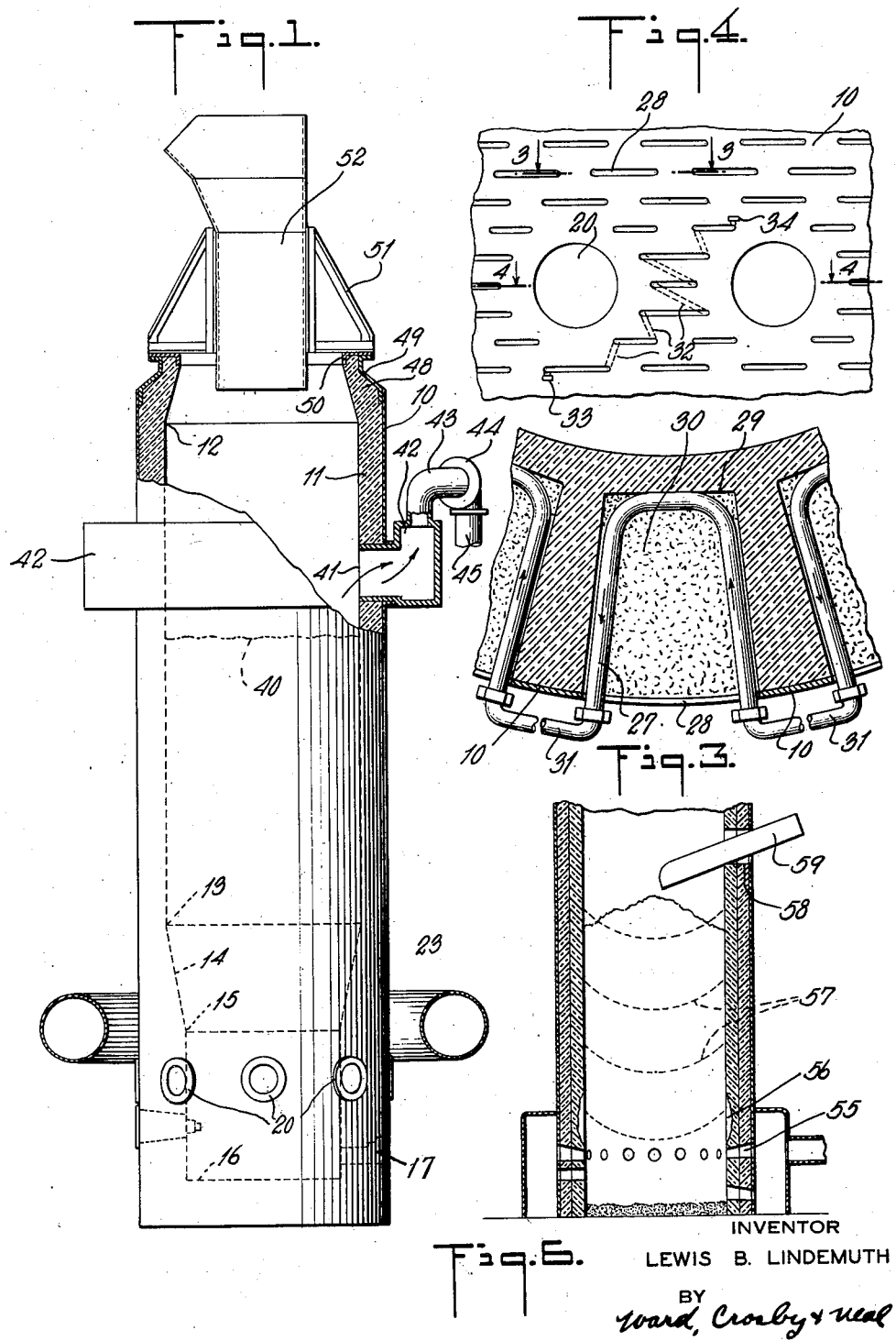
INVENTOR
LEWIS B. LINDEMUTH
BY
Ward, Crosby & Neal
ATTORNEYS March 29, 1949.   L. B. LINDEMUTH   2,465,463
REMELTING FURNACE AND METHOD
FOR REMELTING SCRAP
Filed May 29, 1943                     2 Sheets-Sheet 2
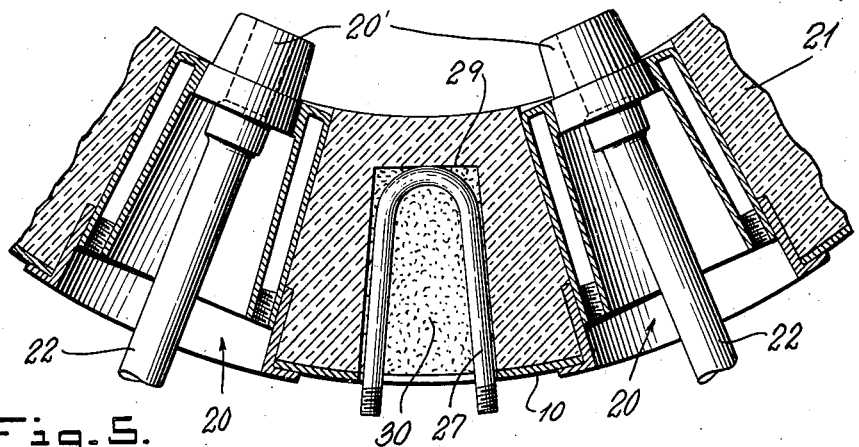
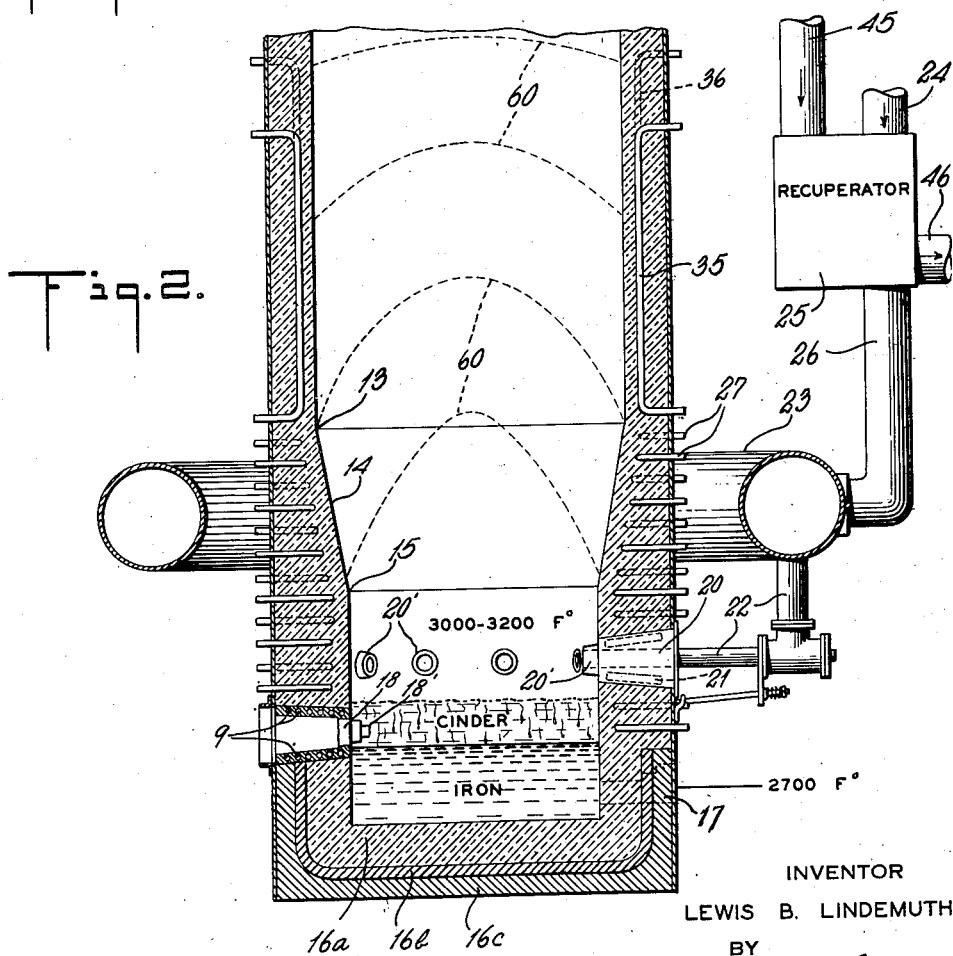
INVENTOR
LEWIS B. LINDEMUTH
BY
ATTORNEYS Patented Mar. 29, 1949

2,465,463

UNITED STATES PATENT OFFICE 2,465,463

REMELTING FURNACE AND METHOD FOR REMELTING SCRAP

Lewis Byron Lindemuth, Port Washington, N. Y., assignor, by mesne assignments, to Steel Ingot Production, Inc., New York, N. Y., a corporation of Delaware Application May 29, 1943, Serial No. 488,999

10 Claims. (Cl. 75—43)

This invention relates to cupola remelting furnaces and methods for remelting metals such as scrap iron, scrap steel and the like.

For a great many years it has been the practice to construct cupola furnaces in the form of a vertical cylindrical stack with a lining of substantially uniform inside diameter throughout. The bottom of such furnaces comprises a pair of doors which swing downwardly and outwardly and which when closed to form the furnace bottom, are covered with a layer of sand up to the level of the tap hole. A slag spout is provided at a somewhat higher level. Above the slag spout a plurality of tuyères are provided through which it is customary to introduce air at very low pressure into the charge, the amount and pressure of the air being kept low, supposedly to prevent undue oxidation of the charge. In such furnaces the charge comprising scrap or pig iron and fuel is introduced from a charging car or wagon through a charging door located at an intermediate point in the side wall of the stack. The melting takes place in a zone just above the tuyères, and the arrangement of the tuyères with respect to the position of the lining is such that in view of the slight air pressure, large proportions of the air and gases pass upwardly in close proximity to the lining at the melting zone. Consequently the iron oxide formed there rapidly corrodes and cuts away the acid lining. For this and other reasons it has been the practice to operate such cupolas only for a short period or "campaign," after which the bottom doors are opened and the remaining furnace contents allowed to drop out. In most cases such furnace runs are confined to one afternoon, and during the next morning the lining is patched and repaired for the next run, and after some 60 or 80 hours at most, it is necessary to reline the furnace.

According to the present invention, the cupola furnace construction is modified in a number of novel ways, and a novel method for remelting scrap is provided making possible the continuous use of the furnace for periods of many weeks or months, without requiring repair or replacement of the lining or otherwise requiring interruption of the continuous operation of the furnace.

Various further and more specific objects, features and advantages of the invention will appear from the description given below taken with the accompanying drawings illustrating by way of example a preferred form of the invention.

In the drawings:

Fig. 1 is an elevational view partly in section showing a cupola remelting furnace in accordance with the invention;

Fig. 2 is a vertical sectional view of the lower portion of the same furnace in conjunction with certain accessory apparatus shown somewhat schematically;

Fig. 3 is a horizontal sectional view of a portion of the furnace lining at an area adjacent the melting zone and showing novel cooling means for the lining in accordance with the invention;

Fig. 4 is an elevational view of a portion of the outside wall of the furnace and indicating a way in which the furnace lining cooling elements may be interconnected;

Fig. 5 is a horizontal sectional view of a portion of the furnace at the tuyère zone; and Fig. 6 is a vertical sectional view on a small scale, showing somewhat schematically the lower portion of a conventional type cupola furnace and the manner in which the heating therein tends to be greatest around the periphery of the charge at the surface of the lining.

Referring now to Fig. 1, the furnace as here shown comprises an outer sheet metal shell 10 provided with a lining 11 formed for example of a good grade of fire brick. This lining may be of a substantially uniform inside diameter from a point as at 12 just below the top of the stack down to a point as at 13 at the top of the melting zone. At the melting zone the lining is formed with a gradual downward and inward restriction in diameter as at 14. From a point as at 15 just above the tuyère zone the lining may continue on down with a uniform smaller diameter. The bottom of the furnace instead of being temporarily closed by doors, is provided with a permanent lining as at 16. The dimensions of the furnace cavity may of course be varied within considerable limits and also depending upon the capacity of the furnace. In the form shown for example, if the outside diameter of the furnace is 11 feet, the inside diameter of the stack portion may preferably be about 9 feet with an inside diameter at the crucible portion of about 7 feet. The crucible portion may for example be 6½ feet high and the melting zone where the lining is inclined inwardly and downwardly may be about 4½ feet high, and the overall height of the furnace may be about 40 feet.

As shown in Fig. 2, the bottom of the furnace may be provided with an inner lining 16a formed for example of carbon blocks, an intermediate lining 16b of chromite or magnesite, and an outer lining 16c of fire clay brick. A tap hole or iron notch may be provided as at 17 at a point for example such that the bottom of the tap hole will be 4 inches or so above the surface of the inner lining 16a, whereby the furnace continues in operation at least a shallow body of molten metal will remain in the bottom of the furnace. In Fig. 2 a "cinder notch" is shown at 18. This may comprise for example a bronze casting, the peripheral walls of which may be formed with water cooling conduits as at 19. The casting preferably is formed with an inlet opening as at 18' which protrudes substantially inwardly of the furnace lining so as to insure that it will reach into the molten material and not become blocked by the more solid material adjacent the lower temperature walls of the lining.

At a somewhat higher level, a plurality of tuyères as at 20 are provided. In the example shown, eight tuyères are provided at uniformly spaced points around the furnace and these are designed to project blasts of air, each of a diameter of about 4 inches, into the furnace at a pressure for example of about 4 pounds per square inch, as contrasted with the practice with cupola furnaces heretofore of using about twice as many smaller tuyères with air pressure in the neighborhood of 8 ounces. The tuyères 20 may comprise bronze castings with fluid cooling cavities if desired, as at 21. Air may be supplied to the tuyères through pipes as at 22 connected to a bustle pipe 23 extending annularly around the furnace. Air may be supplied from a suitable blower (not shown) through a pipe 24, thence if desired through a recuperator 25 and a pipe 26 communicating with the bustle pipe 23.

As shown in Fig. 5, the outlet nozzles as at 20' of the tuyères are preferably so formed as to protrude substantially into the charge within the furnace. This helps insure that the air blasts will penetrate forcefully to the central regions beneath and up into the center of the melting zone with avoidance of the flow of air and gases up along the surface of the furnace lining, which has heretofore resulted in rapid corrosion of the lining. Also the inwardly projecting tuyère nozzles insure that the air blasts will not become obstructed by the cooler portions of the charge adjacent the surface of the lining.

From about the level of the cinder notch up to the top of the melting zone, the furnace lining may be cooled by a plurality of fluid cooling conduits as at 27, the construction of which is shown in further detail in Figs. 3-5. As shown, the conduits 27 may comprise generally U-shaped sections of pipe extending from the exterior of the furnace wall inwardly of the lining, to a region close to the inside surface of the lining, then curving around and extending outwardly again to the exterior of the furnace wall. The sheet metal shell 10 of the furnace is formed with slots as at 28 of suitable shape to permit insertion of the U-shaped pipes, and the lining is formed with cavities as at 29 of dimensions which will permit insertion and removal of the pipes with slight clearance. After the U-shaped pipes are inserted in place, the spaces between their branches within the cavities may be filled with removable more or less loose masses of refractory material as at 30. Adjacent ends of the U-shaped pipes may be detachably connected together as by coupling means 31, connections being provided as indicated by dotted lines 32 of Fig. 4, whereby groups of several adjacent pipes may be connected for the series flow of the cooling fluid through the group. The inlet and outlet terminals as at 33, 34 for each group may be connected to suitable supply and discharge pipes. The number of the U-shaped pipes which are thus connected in each group may be varied depending upon the amount of cooling found necessary to protect various parts of the lining. This arrangement of U-shaped cooling pipes makes possible a wide variation of the degree of cooling if desired or found necessary for proper protection of the furnace lining at all of the higher temperature areas around the melting zone. Also each of the U-shaped pipes being readily replaceable from the exterior of the furnace, if any one of them should become burned out or damaged, it may be repaired or replaced generally while the furnace remains in operation.

As shown in the upper part of Fig. 2, the lining of the lower stack portion per se may be cooled by a series of vertically extending water pipes as at 35, 36. Since at these regions of the furnace the lining will not reach such high temperatures, these pipes may be permanently installed in the lining.

As indicated in Fig. 1, the furnace may be normally kept charged to a level as at 40, considerably below the top of the stack. At a point just above the level 40 a number of gas outlet openings, one of which is shown at 41, may be provided in the side walls. These may be interconnected by an annular bustle pipe 42. This bustle pipe may discharge through a pipe 43 connected if desired to a suction blower 44, which discharges the exhausted gases through a pipe 45. As shown in Fig. 2, the pipe 45 may conduct the hot discharge gases if desired through recuperator 25 for heating the intake air before the gases are discharged through a pipe 46 to the atmosphere.

As shown, the lining within the top of the stack may be upwardly and inwardly restricted somewhat as at 48. The upper end of the furnace shell may terminate with an annular sheet metal or cast retaining ring 49. The top edges of the shell and lining may be covered by a protective ring 50 formed as shown with an inner edge provided with a downward flange for protecting the inner top edges of the lining.

The ring 50 may be formed to present a horizontal flat upper surface upon which a frame 51 is slidable horizontally, this frame serving to support a charging hopper 52. The hopper is thus readily slidable in all horizontal directions with respect to the top edges of the stack and to various positions permitting distribution of the charge from the hopper to all areas within the furnace top. Any gases which are not withdrawn through the bustle pipe 42 may pass out of the top of the stack through the spaces provided in the frame 51 around the sides of the hopper 52. However, it is contemplated that the greater part of the gases will be withdrawn at outlets 41 so that the heat value thereof may be recovered in the recuperator. Since most of the hot gases will pass out through openings 41, the frame 51 and hopper 52 and adjacent parts will not become heated to temperatures interfering with ready manipulation of the charging apparatus for properly distributing the charge. In cupola constructions as heretofore used, the presence of volumes of hot discharge gases at the top of the stack make it impossible in practice to introduce and distribute the charge through the top of the stack. Instead, as above stated, a charging door is provided at an intermediate point in the side wall of the stack, but with the charge opening in this location it becomes difficult or impossible to properly distribute the charge, and consequently gas and air channels tend to form to a troublesome degree in the charge, and the regions of these channels become overheated. This often happens at points adjacent the furnace lining and thus causes rapid destruction or cutting away of the lining.

In prior cupola constructions which have linings of uniform diameter and with small air blasts of low pressure from the tuyères, the above mentioned difficulty due to formation of air in gas channels adjacent the lining, is most severe and destructive of the lining at the melting zone and just above the tuyères. The air blasts being of low pressure, the air is to a large extent deflected by the lower portion of the charge, upwardly along the inner surface of the lining starting immediately above the tuyères. Thus the regions of greatest temperature occur in prior cupolas, at the lining around the periphery of the charge with consequent rapid destruction of the lining while the central portions of the charge are less efficiently heated. Fig. 6 shows somewhat schematically the principal parts of a cupola furnace of the type heretofore used. With this type of construction it will be noted that the tuyères 55 discharge the air at the very inner surface of the lining, and since it has been considered proper practice to use small blasts of relatively low pressure, a large portion of this air is deflected upwardly around the periphery of the charge and along the lining, with the consequence that the lining is quickly corroded away at the melting zone, as indicated at 56. The dotted lines 57 are intended to indicate respectively, regions of equal temperature within the furnace and it will be noted that throughout the height of the charge, portions of the charge at a given level within the middle of the furnace are heated to lower temperatures than portions at the same level around the periphery. Thus the lining throughout the furnace is subject to more severe temperature conditions than the average temperature at any given level. Since the charging opening is located in the side wall of the furnace as at 58, the charge as dumped in from a charging car or wagon 59 tends to keep the central portion of the furnace filled to a higher level than the peripheral portions, since it is difficult to distribute the charge to the peripheral regions in the presence of the high temperature gases. Thus the incoming charges keep the central regions in the furnace more compacted and cooler than the peripheral regions. Hence the channeling of hot air and gases up along the furnace lining is not only promoted by the conditions at the melting zone, but is augmented by the manner in which the furnace is charged. Also since no cooling means is provided for the lining, its rapid destruction is inevitable.

On the other hand, with the present invention these causes contributing to the destruction of the lining are substantially eliminated and at the same time the efficiency of the furnace is greatly increased in terms of the quantity of metal which may be melted with a furnace of a given size operating during any given period of days. The following factors all contribute in varying degrees to these results. First, the air blasts being introduced through nozzles 20' extending inwardly of the lining, are able to readily penetrate the charge instead of being deflected up along the surface of the lining. And since the air blasts are of greater volume and decidedly higher pressure, the air is projected to the central regions of the charge. This insures that a greater part of the melting will tend to occur within the central regions of the melting zone. That is, the melting zone will assume a substantially domed shape surrounded by cooler annular portions of the charge. In Fig. 2 the dotted lines 60 are intended to represent respectively regions of equal temperature at various elevations in the charge. Thus it will be apparent that while the melting zone may extend to a region quite high above the tuyère zone at the central portions of the furnace, yet at the peripheral regions along the surface of the lining, unmelted and lower temperature portions of the charge will extend down around the melting zone and serve to effectively protect the lining. And since the lining at the melting zone expands in diameter upwardly and outwardly as at 14, the rising hot streams of air and gases are largely kept out of contact with the lining. Furthermore, as the charge settles in the furnace, the peripheral cooler portions thereof in the melting zone are gradually crowded by the lining restriction 14 inwardly of the furnace and into the lower central high temperature part of the melting zone.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In a cupola remelting furnace construction having an open top stack, a charging hopper, and a frame for supporting said hopper in position to direct the charge therefrom into the top of the stack, said frame being constructed and arranged to provide a space around the outlet of the hopper and between such outlet and the top edges of the stack for escape of gases from the furnace, said frame also being constructed and arranged for sliding in all horizontal directions on said top edges and thus to various positions permitting distribution of the charge from the hopper to all areas within the furnace top.

2. In combination with a refractory lining within a furnace wall, means for cooling such lining comprising a generally U-shaped section of pipe for cooling fluid, extending from the exterior of the furnace wall inwardly of the lining to a region close to the inside surface of the lining, then curving around and extending outwardly again to the exterior of the furnace wall, the lining being formed with a cavity for removably receiving said pipe and the wall being formed with a slot through which said pipe while in said U shape may be inserted into said cavity or removed for replacement, and a readily removable mass of refractory material substantially filling the space in said cavity between the two sides of said U-shaped section of pipe.

3. In combination with a refractory lining within a furnace wall, means for cooling such lining comprising a generally U-shaped section of pipe for cooling fluid, said section of pipe being positioned in a generally horizontal plane and extending from the exterior of the furnace wall inwardly of the lining to a region close to the inside surface of the lining, then curving around and extending outwardly again to the exterior of the furnace wall, the lining being formed with a cavity for removably receiving said pipe, said pipe section substantially fitting within said cavity, and the wall being formed with a slot through which said pipe while in said U shape may be inserted into said cavity or removed for replacement, and a readily removable mass of refractory material substantially filling the space in said cavity between the two sides of said U-shaped section of pipe.

4. In combination with a refractory lining within a furnace wall, means for cooling such lining comprising a generally U-shaped section of pipe for cooling fluid, extending from the exterior of the furnace wall inwardly of the lining to a region close to the inside surface of the lining, then curving around and extending outwardly again to the exterior of the furnace wall, the lining being formed with a cavity for removably receiving said pipe and the wall being formed with a slot through which said pipe while in said U shape may be inserted into said cavity or removed for replacement.

5. In a cupola furnace, a refractory lining for the melting zone, a plurality of cavities in such lining, said cavities each extending from an opening at the exterior of the furnace wall, inwardly of the lining to points spaced somewhat from the inner surface of the lining, a generally U-shaped pipe for cooling fluid in each of said cavities, said pipes each extending inwardly along one side wall of its cavity, then generally along the inner end wall of the cavity and outwardly along the other side wall of the cavity, means for detachably connecting groups of said pipes in series and to a source of supply of cooling fluid, and removable masses of refractory material substantially filling the remaining spaces in said cavities.

6. In a cupola furnace, a refractory lining for the melting zone, a plurality of cavities in such lining, said cavities each extending from an opening at the exterior of the furnace wall, inwardly of the lining to points spaced somewhat from the inner surface of the lining, a generally U-shaped pipe for cooling fluid in each of said cavities, said pipes each extending inwardly along one side wall of its cavity, then generally along the inner end wall of the cavity and outwardly along the other side wall of the cavity, means for detachably connecting said pipes to a source of supply of cooling fluid, and removable masses of refractory material substantially filling the remaining spaces in said cavities.

7. In a cupola furnace lined with refractory material and comprising a hearth having a permanent bottom and upstanding side walls, having therein metal and slag tapholes and having air-blast tuyères disposed thereabout projecting therethrough, a melting zone having walls sloping upwardly and outwardly from said hearth, and a stack surmounting said melting zone, said tuyères and furnace walls being provided with conduits for circulating cooling water therethrough, the method of operation over prolonged intervals without necessity for shutdown, which consists in: charging metal and solid fuel into said stack, and combusting said fuel in the furnace to melt said metal, while injecting an air-blast through said tuyères with such force as to penetrate forcefully to the central regions beneath and up into the center of the melting zone with avoidance of substantial flow of air and gases up along the surface of the furnace lining, thereby, in conjunction with the projection of said tuyères beyond said hearth lining, and the upwardly and outwardly sloping walls of said melting zone, providing a relatively cool zone adjacent the furnace walls, for minimizing corrosion and erosion thereof; meantime circulating cooling water through the fluid conduits of said tuyères and furnace walls for cooling the same; and withdrawing the molten metal from said taphole.

8. In a cupola furnace having a lining of refractory material and comprising a hearth having a permanent bottom and upstanding side walls, having therein metal and slag tapholes and air-blast tuyères disposed thereabout and projecting therethrough, a melting zone having walls sloping upwardly and outwardly from said hearth, and a stack surmounting said melting zone, said tuyères and furnace walls being provided with conduits for circulating cooling water therethrough, the method of operation over prolonged intervals without necessity for shutdown, which consists in: charging metal and solid fuel into said stack and combusting said fuel in the furnace to melt said metal, while injecting an air-blast through said tuyères with such force as to penetrate forcefully to the central regions beneath and up into the center of the melting zone with avoidance of substantial flow of air and gases up along the surface of the furnace lining, thereby, in conjunction with the projection of said tuyères beyond said hearth lining and the upwardly and outwardly sloping walls of said melting zone, providing a relatively cool zone of gases adjacent the furnace walls for minimizing corrosion and erosion thereof; and meantime circulating cooling water through the fluid conduits of said tuyères and furnace walls for cooling the same; while withdrawing hot combustion gases from said stack and utilizing the same to preheat the air-blast injected through said tuyères; and withdrawing the molten metal through said taphole.

9. A cupola furnace adapted for continuous and uninterrupted operation over extended periods, comprising: an upstanding tubular structure permanently closed at the base, and provided throughout its interior, including said base, with a permanent refractory lining; said furnace comprising a lower hearth portion, an intermediate melting zone portion, and an upper, substantially cylindrical, stack portion, the sectional dimensions of said hearth portion being less than those of said stack portion, and the interior walls of said melting zone portion, sloping upwardly and outwardly from said hearth to said stack; metal tuyères of hollow construction for circulating cooling water therethrough, disposed about and penetrating the upper side walls of said hearth; means including a bustle pipe and direct pipe connections therefrom to said tuyères and means for supplying air under pressure to said bustle pipe and for injecting an air-blast through said tuyères into said furnace with such force as to penetrate to the center of the furnace charge thereby in conjunction with the outwardly sloping walls of said melting zone portion, functioning to divert hot combustion gases away from the furnace walls and toward the central zone of the furnace for minimizing corrosion and erosion of the furnace lining; water cooling conduits provided in the hearth and melting zone walls of said furnace; flue openings and associated flue means provided in the upper side walls of said stack for drawing off hot combustion gases; and furnace charging means mounted atop said stack for charging solid fuel and metal into said furnace.

10. A cupola furnace adapted for continuous and uninterrupted operation for extended periods, comprising: an upstanding metal tubular housing open at the top and permanently closed at the base, and provided throughout its interior, including said base, with a permanent refractory lining, said furnace comprising a lower hearth portion, an intermediate melting zone portion, and an upper, substantially cylindrical stack portion, the sectional dimensions of said hearth portion being less than those of said stack portion, and the inner walls of said melting zone portion sloping upwardly and outwardly from said hearth to said stack; metal tuyères, each including an air-blast injection nozzle and a hollow metal sleeve surrounding the same, the latter for circulation of cooling water therethrough, disposed about and penetrating the upper side walls of said hearth, with said air-blast nozzles projecting into the furnace beyond the refractory lining thereof; means including a bustle pipe and direct pipe connections therefrom to said tuyères and means for supplying air under pressure to said bustle pipe and for injecting an air-blast through said tuyères into said furnace with such force as to penetrate to the center of the furnace charge, thereby, in conjunction with the projection of said tuyère nozzles beyond the hearth lining and the outwardly sloping lining of the melting zone portion, functioning to divert hot combustion gases away from the furnace walls toward the central zone of the furnace, for minimizing corrosion and erosion of the furnace lining; water cooling conduits provided in the hearth and melting zone walls of the furnace; flue apertures and associated flue means provided in the upper side walls of said stack, for drawing off hot combustion gases, said flue means including a recuperator arranged for preheating the air supplied to said bustle pipe; and furnace charging means mounted atop said stack, for loading a charge of solid fuel and metal into said furnace.

LEWIS BYRON LINDEMUTH.

REFERENCES CITED

The following references are of record in the file of this patent:

UNITED STATES PATENTS

| Number | Name | Date |
| --- | --- | --- |
| 244,408 | Weimer | July 19, 1881 |
| 552,372 | Huber | Dec. 31, 1895 |
| 798,402 | Dreyspring | Aug. 29, 1905 |
| 843,950 | Kennedy | Feb. 12, 1907 |
| 1,635,819 | Corcoran | July 12, 1927 |
| 1,858,548 | Ives | May 17, 1932 |
| 1,869,571 | Lenz | Aug. 2, 1932 |
| 1,872,057 | Boegehold | Aug. 16, 1932 |
| 1,873,996 | Cunningham | Aug. 30, 1932 |
| 1,924,842 | Ebner | Aug. 29, 1933 |
| 1,948,695 | Brassert | Feb. 27, 1934 |
| 1,948,696 | Brassert | Feb. 27, 1934 |
| 1,996,784 | Zimmerman | Apr. 9, 1935 |
| 2,124,437 | Steinbacher | July 19, 1938 |
| 2,136,360 | Clair | Nov. 15, 1938 |
| 2,275,515 | Dunham | Mar. 10, 1942 |

FOREIGN PATENTS

| Number | Country | Date |
| --- | --- | --- |
| 115,439 | Austria | Dec. 27, 1929 |

OTHER REFERENCES

Stoughton: "Metallurgy of Iron and Steel," third edition, pages 20, 288, 298 and 309.